Nov. 28, 1961     B. BERNSTEIN     3,011,103
RECTIFIER ASSEMBLY OR THE LIKE
Filed March 31, 1960     2 Sheets-Sheet 1
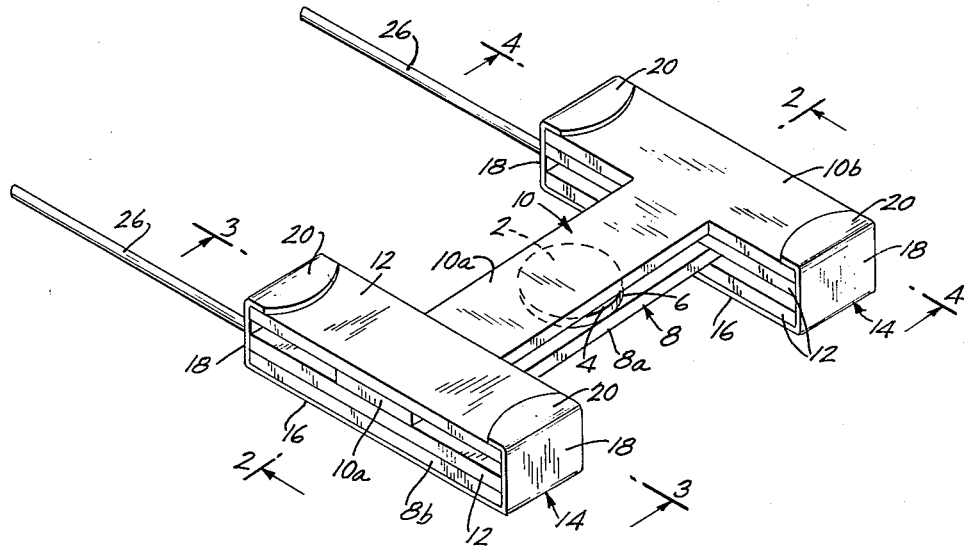
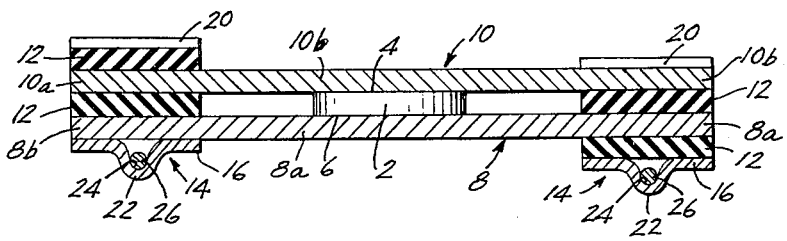
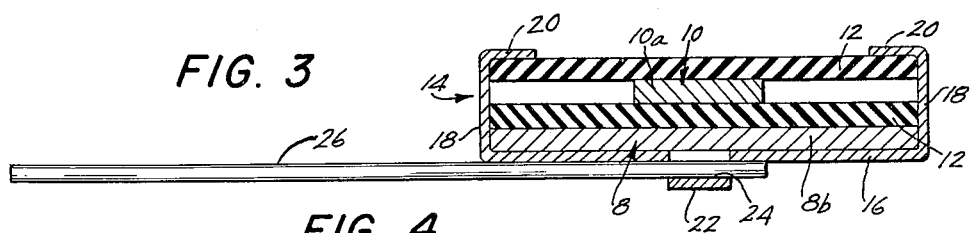
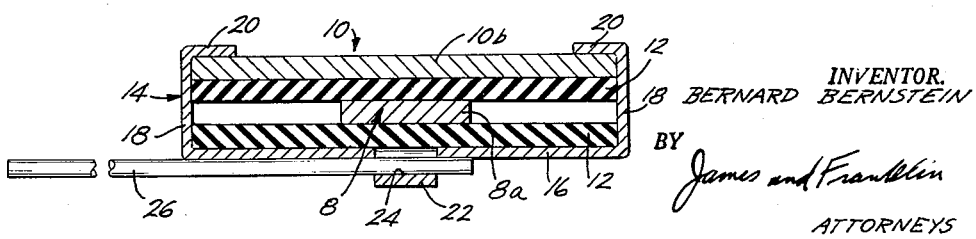
INVENTOR.
BERNARD BERNSTEIN
BY James and Franklin
ATTORNEYS Nov. 28, 1961  B. BERNSTEIN  3,011,103
RECTIFIER ASSEMBLY OR THE LIKE
Filed March 31, 1960  2 Sheets-Sheet 2

INVENTOR.
BERNARD BERNSTEIN
BY James and Franklin
ATTORNEYS

United States Patent Office 3,011,103
Patented Nov. 28, 1961

3,011,103
RECTIFIER ASSEMBLY OR THE LIKE
Bernard Bernstein, Brooklyn, N.Y., assignor to Radio Receptor Company, Inc., Brooklyn, N.Y., a corporation of New York
Filed Mar. 31, 1960, Ser. No. 19,002
13 Claims. (Cl. 317—234)

The present invention relates to a structure designed for the mounting of, and the making of electrical connection to, electrical units such as selenium diode rectifiers or the like.

There is a great demand for inexpensive selenium diode rectifier assemblies. These assemblies generally comprise the rectifier unit itself, in the form of a disk or plate of appropriate material the surfaces of which are coated in known manner, together with a structure for supporting and protecting that unit and making electrical connection thereto. Electrical connection is generally made by means of parts pressed against the opposite faces of the rectifier unit with a force which is sufficiently great for the purpose, but which must not be excessive, since the rectifier units are somewhat fragile and subject to breakage if excessive pressures are applied thereto.

It is very difficult on a production basis to achieve the application of a pressure within the proper range. The problem is complicated by the fact that sufficient pressure must be exerted on the finished assembly to ensure that the rectifier unit will remain fixed in proper position within or on the mounting structure therefor. When attempts are made to use machine presses in putting the assemblies together the results have not been satisfactory from a production point of view. The amount of pressure required to be exerted by the press to hold the various parts in place and secure them in assembled relationship often causes the rectifier elements to break, and even if a satisfactory compromise value of clamping pressure can theoretically be used, it has as a practical matter been found impossible to apply precisely that pressure to all of the assemblies produced, with the result that the parts of some assemblies are insecurely clamped and the parts of other assemblies are too tightly clamped.

The overall assembly must also provide means for connecting the rectifier unit to external circuitry. These means usually take the form of leads extending from the assembly. The connection of these leads to the assembly is often time consuming and expensive.

The structure of the present invention permits reliable and effective mechanical and electrical connection of the various parts involved in an electrical assembly of the type under discussion without the disadvantages set forth above. The clamping action, usually power press-exerted, which distorts the mounting members in order to hold the other parts in assembled condition, is not applied directly or rigidly to the rectifier unit proper, but is instead transferred to that unit by means of yieldable structural members which also serve to make electrical connection with the opposite faces of the rectifier unit. Consequently the clamping pressure may be as great as is needed to secure the parts together in assembled relationship, and may vary within limits as determined by random variation in the action of the press or by slight departures of the parts from optimum dimensions, without adversely affecting or causing damage to the rectifier unit itself.

To this end the rectifier unit itself is disposed between a pair of conductive strips both of which extend in different directions beyond the rectifier unit. The extending portions of those elements are received within mounting and clamping members which are bent around those extending portions hold them in position, and press them toward one another. The extending element portions are insulated from one another and each is electrically connected to a different clamping member. The leads by means of which electrical connection to external circuitry is achieved may be physically secured and electrically connected to the clamping members prior to the time that those members are bent about the extending element portions. Since the clamping pressure is exerted only at the areas of the clamping members, and hence only at areas relatively remote from the rectifier unit itself, that pressure may be as great as needed to ensure proper clamping of the parts in assembled relationship. When the elements between which the rectifier proper unit are thus clamped over areas remote from the rectifier unit proper, that unit in turn will be pressed between those elements, but with a force which is determined in part by the resiliency of those portions of the elements located between the clamped portions thereof and the areas between which the rectifier unit is located. The resiliency of the elements will therefore ensure that the pressure exerted by the elements directly on the rectifier unit will be appropriate and not excessive.

In the form here specifically disclosed the conductive elements between which the rectifier unit is received are each of T-shape, the vertical legs of which are positioned respectively over and under the rectifier unit and the horizontal cross-bars of which are disposed on opposite sides of that unit. A pair of U-shaped clamping members are employed, each of those members receiving within itself the cross-bar of one conductive element and the end of the vertical leg of the other conductive element, with insulating strips sandwiched between the conductive element parts and the clamping member itself so as to insulate the clamped ends of the conductive elements from one another and permit the clamping member to make electrical connection with only one of the conductive elements, and preferably with that conductive element the cross-bar of which is received therein. The clamping members are preferably formed of sheet metal and have parts adapted to be bent over the built-up stack of insulating strips and conductive element portions and to be clamped down against that build-up. A portion of each clamping member may be bent out therefrom in order to receive an end of a lead which may be crimped thereto and, if desired, soldered thereto.

The resulting assembly is made up of a series of simple and inexpensive parts which may individually be manufactured inexpensively on a production line basis to relatively loose tolerances. The assembly of the various parts is simple and well adapted to mass production requirements.

To the accomplishment of the above, and to such other objects as may hereinafter appear, the present invention relates to an assembly for mounting and making electrical connection to an electrical unit such as a selenium diode rectifier, as defined in the appended claims and as described in this specification, taken together with the accompanying drawings, in which:

FIG. 1 is a three-quarter perspective view of one embodiment of the present invention in assembled condition;

FIG. 2 is a cross sectional view taken along the line 2—2 of FIG. 1;

FIG. 3 is a cross sectional view taken along the line 3—3 of FIG. 1;

FIG. 4 is a cross sectional view taken along the line 4—4 of FIG. 1; and

Figure 5:
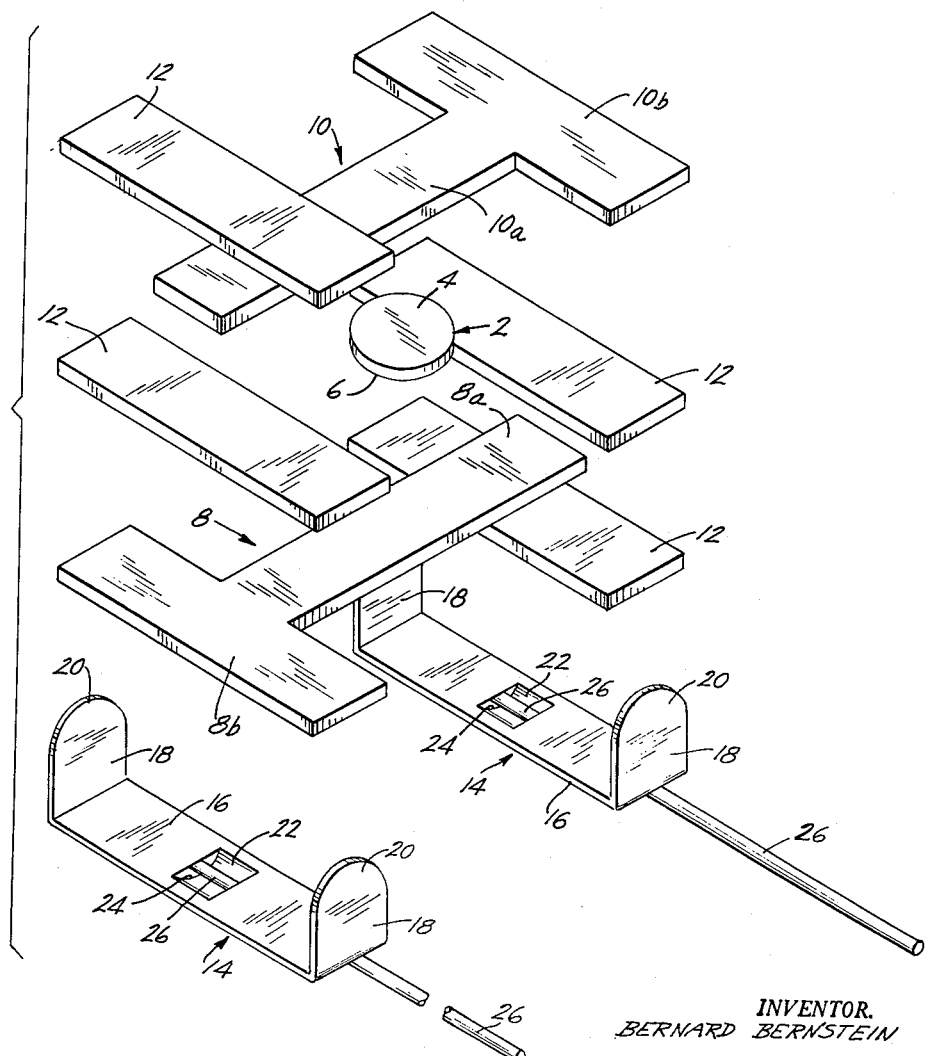
FIG. 5 is a three-quarter perspective exploded view of the various parts.

The electrical unit which is to be mounted and to which electrical connection is to be made is here disclosed in the form of a selenium diode rectifier plate, generally designated 2, of conventional construction and form. This unit comprises a disk or plate of appropriate material coated in known manner in order to produce the desired conductive characteristics between its upper surface 4 and its lower surface 6.

A pair of contact strips generally designated 8 and 10 are employed, each being of T-shape and comprising a vertical leg 8a or 10a and a horizontal cross-bar 8b or 10b respectively. The two conductive strips 8 and 10 may be identical in shape. They are formed of conductive material which is resiliently distortable, such as beryllium copper. The length of their vertical legs 8a and 10a is greater than the length of the rectifier unit 2, and their width is also preferably greater than the width of the rectifier unit 2. The rectifier unit 2 is received between intermediate portions of the vertical legs 8a and 10a of the conductive strips 8 and 10. The conductive strips 8 and 10 are oppositely oriented, so that the cross-bar 8b of the strip 8 extends over the end of the vertical leg 10a of the strip 10, while the cross-bar 10b of the strip 10 extends over the end of the vertical leg 8a of the strip 8.

Four insulating strips 12 are employed, each having a length and width similar to the corresponding dimensions of the conductive strip cross-bars 8b and 10b. At the left hand end of the assembly as viewed in the drawings, an insulating strip 12 is positioned between the conductive strip portions 8b and 10a and another insulating strip 12 is positioned on top of the conductive strip portion 10a, both of the strips 12 being substantially aligned with the conductive strip portion 8b. At the right hand end of the assembly as viewed in the drawings, an insulating strip 12 is interposed between the conductive strip portions 10b and 8a, and the other insulating strip 12 is positioned beneath the end of the strip portion 8a, both of these insulating strips 12 being substantially aligned with the conductive strip portion 10b.

A pair of clamping members generally designated 14 are employed. Each comprises a bottom wall 16, a pair of side walls 18 extending up therefrom, and top wall parts 20 initially extending up in line with the side walls 18 (see FIG. 5) but bendable at right angles thereto. The clamping member may be formed of any appropriate conductive sheet metal, such as brass. The dimensions of the bottom walls 16 are approximately similar to those of the conductive strip portions 8b and 10b, the height of the side walls 18 corresponds to the combined thicknesses of two insulating strips 12 and the two conductive strips 8 and 10, and the top wall parts 20 have a length sufficient to permit them to be bent and clamped over the built-up structures of insulating strips and conductive element portions adapted to be received within them. A portion 22 of the bottom wall 16 may be struck out therefrom to define a passage 24 within which one end of a wire lead 26 is adapted to be received. After the wire 26 has been inserted into the passage 24 the wall portion 22 may be deformed to clinch the wire securely in position, after which the joint between the wire and the clamping member 14 may be tinned or soldered in order to achieve a more reliable electrical connection therebetween.

When the various parts are to be permanently assembled together the build-up of conductive element portion 8b, insulating strip 12, conductive element portion 10a and insulating strip 12 is inserted into one of the clamping members 14 so as to rest on the bottom wall 16 and between the side walls 18 thereof, while the build-up consisting of insulating strip 12, the conductive element portion 8a, a second insulating strip 12 and the conductive portion element 10b are inserted within other clamping member 14 in similar manner. The leads 26 have been connected to the respective clamping members 14 prior to this operation. Thereafter, either manually or by a machine such as a power press, the top wall parts 20 of the clamping members 14 are bent over the build-ups received within the respective clamping members and are pressed down firmly and forcibly in order to clamp together the parts received therewithin in a permanent manner. Since each of the clamping members 14 is located beyond the rectifier unit 2, the clamping pressure exerted on the top wall parts 20 may be as great as is needed to secure the parts together. That pressure is transmitted by the vertical conductive element legs 8a and 10a to the rectifier unit 2, those conductive element legs thus being pressed against the surfaces 4 and 6 of the rectifier unit 2 and making proper electrical connection therewith, at the same time exerting sufficient force on the rectifier unit 2 to retain it in place. That force may well be considerably less than the clamping pressure which is exerted on the clamping member top wall parts 20 during the assembling operation.

The left hand clamping member 14 as viewed in the drawings will directly engage the cross-bar 8b of the conductive element 8, and therefore will be in electrical connection therewith, but it is insulated from the leg 10a of the conductive element 10 so that it will not make electrical connection therewith. Conversely, the right hand clamping member 14 will make electrical connection with the cross-bar 10b of the conductive element 10 but will be insulated from the conductive element 8. Hence the leads 26 which are electrically connected to the clamping members 14 will respectively be in electrical connection with the faces 4 and 6 of the rectifier unit 2.

After the assembly has been formed as described, it may then be sealingly coated, as by encapsulation or molding, the leads 26 extending out from the coated unit to facilitate connection to external circuitry.

The parts involved are all simple in shape and easy to manufacture on a production basis. The parts may be individually manipulated in the course of assembly, and the assembly operation can be carried out quickly and without need for any special precaution or delicacy. The fragile part of the assembly, the rectifier unit 2 itself, is well protected against damage.

While but a single embodiment of the present invention has been here disclosed, it will be apparent that many variations may be made therein, all within the scope of the instant invention as defined in the following claims.

I claim:

1. In combination, an electrical unit, a pair of conductive elements between and in operative physical and conductive engagement with which said unit is mounted, said elements each having force-transmitting portions extending to different sides of said unit, a pair of clamping members with each of which the extending element portions at a given side of said unit are clampingly operatively engaged, said extending element portions being electrically insulated from one another, one extending portion of each element being electrically connected to a different clamping member with which it is operatively engaged and the other extending portion of each element being electrically insulated from the clamping member with which it is operatively engaged, and leads extending from said clamping members.

2. The combination of claim 1, in which said clamping members are formed of conductive bendable material and have parts offset therefrom within which said leads are received.

3. The combination of claim 1, in which said clamping members comprise a bottom wall, side walls extending up therefrom between which said extending element portions are received, and top wall parts extending from said side walls and bent over said extending elements portions to hold them in clamped condition.

4. The combination of claim 3, in which one of said clamping member walls has a part offset therefrom within which said lead connected thereto is received.

5. The combination of claim 1, in which said elements are provided, at one extending end portion, with a laterally projecting part, the laterally extending parts of each of said elements being located within a different clamping member and constituting at least in part the electrical connection thereto, the other end portions of each of said elements being electrically insulated from the clamping members with which they are operatively engaged.

6. In combination, an electrical unit, a pair of conductive elements between and in operative physical and conductive engagement with which said unit is mounted, said elements each having force-transmitting portions extending to different sides of said unit, a pair of clamping members within each of which the extending element portions at a given side of said unit are clampingly received in overlying relationship, insulating members in each clamping member physically between the extending element portions there received and electrically insulating said element portions from one another, one extending portion of each element being electrically connected to a different clamping member within which it is received and the other extending portion of each element being electrically insulated from the clamping member within which it is received, and leads extending from said clamping members.

7. The combination of claim 6, in which said clamping members are formed of conductive bendable material and have parts offset therefrom within which said leads are received.

8. In combination, an electrical unit, a pair of conductive elements between and in operative physical and conductive engagement with which said unit is mounted, said elements each having force-transmitting portions extending to different sides of said unit, a pair of clamping members within each of which the extending element portions at a given side of said unit are clampingly received, said extending element portions being electrically insulated from one another, an extending portion of each element operatively physically and conductively engaging a different clamping member in which it is received, and an insulating part clamped between the other extending portion of each element and the clamping member in which it is received.

9. The combination of claim 8, in which said clamping members are formed of conductive bendable material and have parts offset therefrom within which said leads are received.

10. In combination, an electrical unit, a pair of conductive elements between and in operative physical and conductive relation to which said unit is mounted, said elements each having force-transmitting portions extending to different sides of said unit, a pair of clamping members within each of which the extending element portions at a given side of said unit are clampingly received in overlying relationship, insulating members in each clamping member physically between the extending element portions there received and electrically insulating said element portions from one another, an extending portion of each element operatively physically and conductively engaging a different clamping member within which it is received, and an insulating part clamped between the other extending portion of each element and the clamping member in which it is received.

11. The combination of claim 10, in which said clamping members are formed of conductive bendable material and have parts offset therefrom within which said leads are received.

12. In combination, an electrical unit, a pair of conductive elements between and in operative physical and conductive engagement with which said unit is mounted, said elements each having force-transmitting portions extending to different sides of said unit, a pair of clamping members with each of which the extending element portions at a given side of said unit are clampingly operatively engaged, said extending element portions being electrically insulated from one another, and leads extending from said clamping members respectively, each lead being electrically connected to an extending portion of a different element.

13. The combination of claim 12 in which said clamping members comprise a bottom wall, side walls extending up therefrom between which said extending element portions are received, and top wall parts extending from said side walls and bent over said extending element portions to hold them in clamped condition.

References Cited in the file of this patent

UNITED STATES PATENTS

| | | |
|---|---|---|
| 2,758,262 | Geisselsoder | Aug. 7, 1956 |
| 2,810,872 | Nord et al. | Oct. 22, 1957 |
| 2,931,959 | Parow | Apr. 5, 1960 |